United States Patent
Ando et al.

(10) Patent No.: US 7,565,939 B2
(45) Date of Patent: Jul. 28, 2009

(54) POWER OUTPUT APPARATUS, MOTOR VEHICLE EQUIPPED WITH POWER OUTPUT APPARATUS, AND CONTROL METHOD OF POWER OUTPUT APPARATUS

(75) Inventors: Daigo Ando, Nisshin (JP); Toshio Inoue, Gotenba (JP); Tsukasa Abe, Gotenba (JP); Naoto Suzuki, Fujinomiya (JP); Yukio Kobayashi, Kasugai (JP); Osamu Harada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 483 days.

(21) Appl. No.: 11/438,398

(22) Filed: May 23, 2006

(65) Prior Publication Data
US 2006/0260853 A1    Nov. 23, 2006

(30) Foreign Application Priority Data
May 23, 2005   (JP) ............... 2005-150177

(51) Int. Cl.
*B60W 10/06* (2006.01)

(52) U.S. Cl. .............. 180/65.28; 180/65.275; 180/65.285; 180/65.29; 123/339.23

(58) Field of Classification Search ........... 180/65.4; 903/941, 942, 943; 123/339.23
See application file for complete search history.

(56) References Cited

U.S. PATENT DOCUMENTS

| | | | | |
|---|---|---|---|---|
| 3,661,131 A | * | 5/1972 | Croft | 123/339.23 |
| 4,337,742 A | * | 7/1982 | Carlson et al. | 123/339.17 |
| 5,842,534 A | * | 12/1998 | Frank | 180/65.2 |

FOREIGN PATENT DOCUMENTS

| | | | |
|---|---|---|---|
| JP | A 11-107834 | | 4/1999 |
| JP | A 11-187577 | | 7/1999 |
| JP | A 2000-097069 | | 4/2000 |
| JP | A-2000-097070 | | 4/2000 |
| JP | A 2001-268711 | | 9/2001 |
| JP | 2003-142693 | * | 5/2003 |
| JP | A-2004-346781 | | 12/2004 |

* cited by examiner

*Primary Examiner*—Christopher P Ellis
*Assistant Examiner*—Bryan A Evans
(74) *Attorney, Agent, or Firm*—Oliff & Berridge, PLC

(57) ABSTRACT

In a hybrid vehicle of the invention, the control procedure corrects an idling intake air flow Qidl to enable an engine immediately after its start to generate an output power Pe that is substantially equivalent to an engine power demand Pe*. After the correction, the control procedure controls the engine to have an intake air flow Qe with reflection of an intake air flow correction value Qec and controls a motor MG1 to generate electric power by using the output power Pe of the engine and to charge a battery with the generated electric power within an input limit Win of the battery. The control of the invention ensures that the output power Pe of the engine does not exceed the engine power demand Pe* in restriction of the charge level of the battery. This arrangement effectively prevents the state of charge SOC of the battery, which is charged with the electric power generated by the motor MG1, from exceeding the input limit Win.

11 Claims, 13 Drawing Sheets

POWER OUTPUT APPARATUS, MOTOR VEHICLE EQUIPPED WITH POWER OUTPUT APPARATUS, AND CONTROL METHOD OF POWER OUTPUT APPARATUS

BACKGROUND OF THE INVENTION

1. Field of the Invention

The present invention relates to a power output apparatus, a motor vehicle equipped with the power output apparatus, and a control method of the power output apparatus.

2. Description of the Related Art

Background Art

A known power output apparatus that outputs power to a driveshaft is disclosed in, for example, Japanese Patent Laid-Open Gazette No. H11-187577 and has an engine, a first motor, a second motor, a planetary gear mechanism that includes a planetary carrier linked to an output shaft of the engine, a sun gear linked to a rotor of the first motor, and a ring gear linked to a rotor of the second motor, and a battery that is charged with electric power generated by one or both of the two motors using part of an output torque of the engine. In this prior art power output apparatus, a rotating shaft of the second motor is connected to the driveshaft via a gear mechanism or another equivalent mechanism. This power output apparatus uses a preset map to specify an input limit corresponding to the measured temperature of the battery and determines an allowable charge level of the battery within the specified input limit. The map is designed to give a smaller absolute value of the input limit in a low temperature range below a predetermined temperature than the absolute value of the input limit in an ordinary temperature range.

SUMMARY OF THE INVENTION

In the prior art power output apparatus, the battery is charged with the electric power generated by at least one of the two motors using the output torque of the engine. There may be a difference between an intake air flow actually supplied to the engine and a target intake air flow to be supplied to the engine. The battery may be overcharged above the input limit in the presence of such an intake air flow difference when the temperature of the battery enters the low temperature range where the input limit has the smaller absolute value than the absolute value in the ordinary temperature range.

The object of the invention is thus to eliminate the drawbacks of the prior art and to provide a power output apparatus that prevents an accumulator unit, such as a secondary battery, from being overcharged above a preset charge limit, as well as to a motor vehicle equipped with such a power output apparatus and a control method of such a power output apparatus.

In order to attain at least part of the above and the other related objects, the present invention is constructed as follows.

The present invention is directed to a power output apparatus that outputs power to a driveshaft. The power output apparatus includes: an internal combustion engine that is driven to output power; an electric power-mechanical power input output mechanism that is connected with an output shaft of the internal combustion engine and with the driveshaft and outputs at least part of the power of the internal combustion engine to the driveshaft through input and output of electric power and mechanical power; an accumulator unit that transmits electric power to and from the electric power-mechanical power input output mechanism; and a control module that corrects a specific parameter, which relates to a variation in output power of the internal combustion engine, to enable the internal combustion engine immediately after its start to generate an output power that is substantially equivalent to a preset engine power demand required for the internal combustion engine. After the correction of the specific parameter, the control module controls the internal combustion engine with reflection of the correction of the specific parameter and controls the electric power-mechanical power input output mechanism to generate electric power by using the power of the internal combustion engine and to charge the accumulator unit with the generated electric power within an input limit of the accumulator unit.

The power output apparatus of the invention corrects the specific parameter relating to the variation in output power of the internal combustion engine and thereby enables the internal combustion engine immediately after its start to generate the output power that is substantially equivalent to the engine power demand. After the correction, the power output apparatus controls the internal combustion engine with reflection of the correction of the specific parameter and controls the electric power-mechanical power input output mechanism to generate electric power by using the output power of the internal combustion engine and to charge the accumulator unit with the generated electric power within the input limit of the accumulator unit. Namely the internal combustion engine is controlled to generate the output power that is practically equal to the engine power demand required for the internal combustion engine, prior to a start of charging the accumulator unit. There is accordingly no fear that the output power of the internal combustion engine exceeds the engine power demand required for the internal combustion engine in restriction of the charge level of the accumulator unit. This arrangement effectively prevents the state of charge of the accumulator unit, which is charged with the electric power generated by the electric power-mechanical power input output mechanism, from exceeding the input limit.

The specific parameter relating to the variation in output power of the internal combustion engine may be one or plurality of various output-affecting factors including an intake air flow, an amount of fuel injection, a fuel injection timing, and an ignition timing. The flow of electric current to the accumulator unit at low temperatures may cause a significant voltage increase over a voltage resistance of each constituent of the accumulator unit. By taking into account this possibility, the input limit of the accumulator unit may be set to have a smaller absolute value and decrease an allowable charge level with a temperature decrease in a low temperature range.

In one preferable embodiment of the invention, the power output apparatus further includes an intake air flow regulation unit that regulates an intake air flow into the internal combustion engine. The control module controls the intake air flow regulation unit to supply a preset idling intake air flow of the air to the internal combustion engine immediately after its start and attain an idling operation of the internal combustion engine, and corrects the idling intake air flow as the specific parameter to make a rotation speed of the internal combustion engine in the idling operation sufficiently approach to a predetermined idling rotation speed. After the correction of the idling intake air flow as the specific parameter, the control module controls the internal combustion engine with reflection of the correction of the specific parameter and controls the electric power-mechanical power input output mechanism to generate electric power by using the power of the internal combustion engine and to charge the accumulator unit with the generated electric power within the input limit of the accumulator unit. For example, when the intake air flow immediately after a start of the internal combustion engine is significantly greater than a required intake air flow for output of the engine power demand, the accumulator unit may be overcharged above the input limit under control of the operation of the internal combustion engine without the correction of the intake air flow. The power output apparatus of this embodiment, however, corrects the intake air flow to make the rotation speed of the internal combustion engine in the idling operation sufficiently approach to the predetermined idling rotation speed, prior to the charge to the accumulator unit. This arrangement effectively prevents the overcharge of the accumulator unit. In one preferable application of this embodiment, the control module performs the correction on a start of the internal combustion engine when a temperature of the accumulator unit is in a preset very low temperature range, and the idling intake air flow in the preset very low temperature range is set to a greater value than a value in an ordinary temperature range. When the idling intake air flow in the preset very low temperature range is significantly greater than the idling intake air flow in the ordinary temperature range, it is highly possible that the accumulator unit is overcharged above the input limit under control of the operation of the internal combustion engine without the correction of the intake air flow. Application of the technique of the invention is thus especially effective in the very low temperature range.

In one preferable application of the power output apparatus of the invention, the control module performs the correction when a maximum potential deviation between the engine power demand required for the internal combustion engine and an actual output power of the internal combustion engine under control of the operation without the correction exceeds the input limit of the accumulator unit, while not performing the correction when the maximum potential deviation does not exceed the input limit of the accumulator unit. When the maximum possible deviation does not exceed the input limit of the accumulator unit, there is no fear of overcharging the accumulator unit above the input limit. This state does not require the correction of the specific parameter but allows an early start of charging the accumulator unit. The maximum possible deviation between the engine power demand required for the internal combustion engine and the actual output power of the internal combustion engine under control without the correction may be determined experimentally or empirically. For example, the maximum possible deviation may be a maximum value of the deviation against the setting the engine power demand to a minimum level, for example, 1 kW.

In another preferable application of the power output apparatus of the invention, when there is an urgent requirement for charging the accumulator unit, the control module does not perform the correction but controls the internal combustion engine and the electric power-mechanical power input output mechanism to generate electric power by using the power of the internal combustion engine and to charge the accumulator unit with the generated electric power within the input limit of the accumulator unit. The correction of the specific parameter is skipped when there is an urgent requirement for charging the accumulator unit (for example, when the accumulator unit has a significantly low state of charge and may cause a failure without immediate charge). This arrangement enables immediate charge of the accumulator unit.

In one preferable application of the power output apparatus of the invention, the control module controls the internal combustion engine after the correction to generate a substantially fixed output power and have a substantially fixed rotation speed and subsequently updates the correction. In another preferable application of the power output apparatus of the invention, the control module updates the correction only when the internal combustion engine after the correction generates a substantially fixed output power and has a substantially fixed rotation speed. The correction of the specific parameter set immediately after the start of the internal combustion engine may become inadequate during the operation of the internal combustion engine. In either of these applications, the update keeps the correction continuously adequate. In these applications of updating the correction under some conditions, the control module may update the correction with restriction of a threshold value set to prevent a potential stall of the internal combustion engine.

In the power output apparatus of the invention, the electric power-mechanical power input output mechanism may include: a generator that outputs power to a rotating shaft; and a three shaft-type power input output module that is linked to three shafts, that is, an output shaft of the internal combustion engine, the rotating shaft of the motor, and the drive shaft, and determines power input from and output to a residual one shaft based on powers input from and output to any two shafts among the three shafts. The electric power-mechanical power input output mechanism may otherwise include a pair-rotor motor that has a first rotor linked to an output shaft of the internal combustion engine and a second rotor linked to the drive shaft and rotates the first rotor and the second rotor relative to each other.

The present invention is further directed to a motor vehicle equipped with the power output apparatus having any of the above arrangements described above, that is, the power output apparatus that outputs power to a driveshaft and includes: an internal combustion engine that is driven to output power; an electric power-mechanical power input output mechanism that is connected with an output shaft of the internal combustion engine and with the driveshaft and outputs at least part of the power of the internal combustion engine to the driveshaft through input and output of electric power and mechanical power; an accumulator unit that transmits electric power to and from the electric power-mechanical power input output mechanism; and a control module that corrects a specific parameter, which relates to a variation in output power of the internal combustion engine, to enable the internal combustion engine immediately after its start to generate an output power that is substantially equivalent to a preset engine power demand required for the internal combustion engine, and after the correction of the specific parameter, the control module controls the internal combustion engine with reflection of the correction of the specific parameter and controls the electric power-mechanical power input output mechanism to generate electric power by using the power of the internal combustion engine and to charge the accumulator unit with the generated electric power within an input limit of the accumulator unit.

The motor vehicle of the invention is equipped with the power output apparatus having any of the above arrangements described above, and accordingly exerts the similar effects to those of the power output apparatus of the invention described above. The motor vehicle of the invention thus effectively prevents the state of charge of the accumulator unit, which is charged with the electric power generated by the electric power-mechanical power input output mechanism, from exceeding the input limit.

In one preferable embodiment of the invention, the power output apparatus further includes: a motor that inputs and outputs power from and to the driveshaft; and a driving force demand setting unit that sets a driving force demand required for the driveshaft. The accumulator unit is constructed to transmit electric power to and from the motor. The control module controls the internal combustion engine, the electric power-mechanical power input output mechanism, and the motor to output a driving force, which practically satisfies the driving force demand set by the driving force demand setting unit, to the driveshaft.

The present invention is further directed to a control method of a power output apparatus that outputs power to a driveshaft and includes an internal combustion engine, an electric power-mechanical power input output mechanism that is connected with an output shaft of the internal combustion engine and with a driveshaft and outputs at least part of the power of the internal combustion engine to the driveshaft through input and output of electric power and mechanical power, and an accumulator unit that transmits electric power to and from the electric power-mechanical power input output mechanism. The control method includes the steps of: (a) correcting a specific parameter, which relates to a variation in output power of the internal combustion engine, to enable the internal combustion engine immediately after its start to generate an output power that is substantially equivalent to a preset engine power demand required for the internal combustion engine; and (b) after the step (a), controlling the internal combustion engine with reflection of the correction of the specific parameter in the step (a) and controlling the electric power-mechanical power input output mechanism to generate electric power by using the power of the internal combustion engine and to charge the accumulator unit with the generated electric power within an input limit of the accumulator unit.

The control method of the invention corrects the specific parameter relating to the variation in output power of the internal combustion engine and thereby enables the internal combustion engine immediately after its start to generate the output power that is substantially equivalent to the engine power demand. After the correction, the method controls the internal combustion engine with reflection of the correction of the specific parameter and controls the electric power-mechanical power input output mechanism to generate electric power by using the output power of the internal combustion engine and to charge the accumulator unit with the generated electric power within the input limit of the accumulator unit. Namely the internal combustion engine is controlled to generate the output power that is practically equal to the engine power demand required for the internal combustion engine, prior to a start of charging the accumulator unit. There is accordingly no fear that the output power of the internal combustion engine exceeds the engine power demand required for the internal combustion engine in restriction of the charge level of the accumulator unit. This arrangement effectively prevents the state of charge of the accumulator unit, which is charged with the electric power generated by the electric power-mechanical power input output mechanism, from exceeding the input limit.

In one preferable embodiment of the invention, the control method further includes an intake air flow regulation unit that regulates an intake air flow into the internal combustion engine. In this embodiment, the step (a) controls the intake air flow regulation unit to supply a preset idling intake air flow to the internal combustion engine immediately after its start and attain an idling operation of the internal combustion engine, and corrects the idling intake air flow as the specific parameter to make a rotation speed of the internal combustion engine in the idling operation sufficiently approach to a predetermined idling rotation speed. After the step (a), the step (b) controls the internal combustion engine with reflection of the correction of the specific parameter in the step (a) and controls the electric power-mechanical power input output mechanism to generate electric power by using the power of the internal combustion engine and to charge the accumulator unit with the generated electric power within the input limit of the accumulator unit.

The control method of the invention may further include respective steps that attain the same functions and effects as those attained with various arrangements described above in connection with the power output apparatus.

DESCRIPTION OF THE PREFERRED EMBODIMENTS

Figure 1:
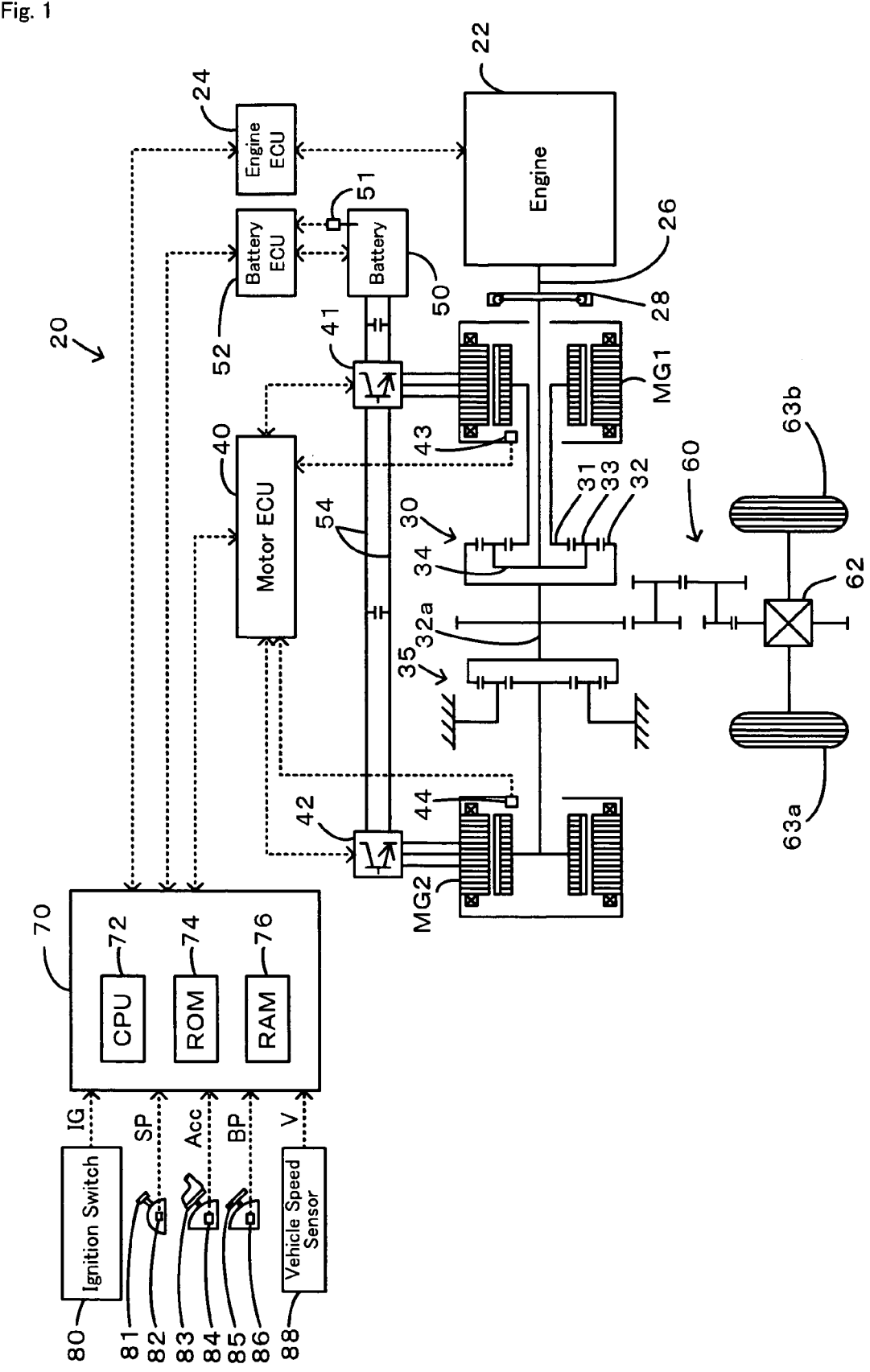
FIG. 1 schematically illustrates the configuration of a hybrid vehicle 20 of one embodiment of the invention.
Figure 2:
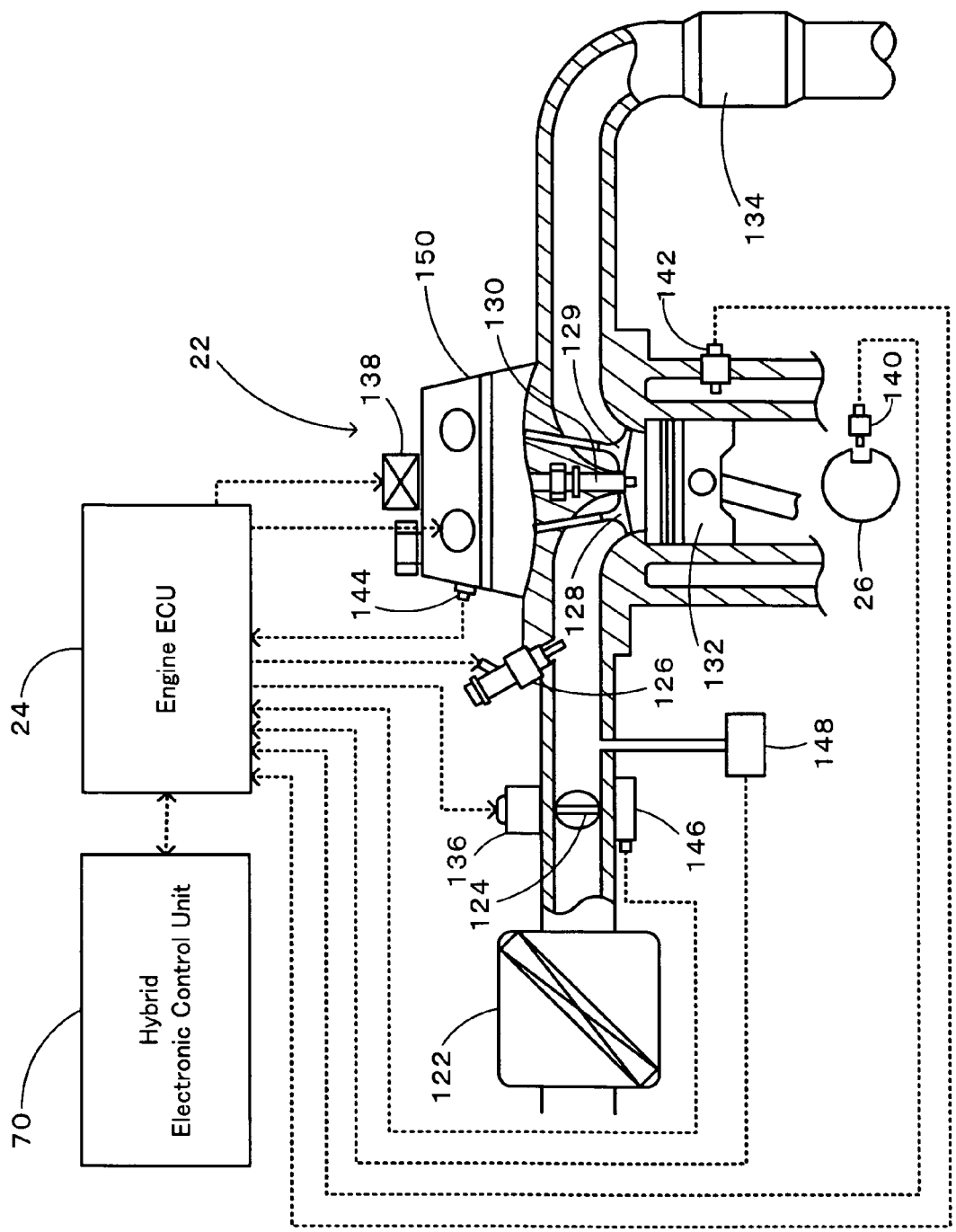
FIG. 2 schematically illustrates the configuration of an engine 22 mounted on the hybrid vehicle 20.

FIG. 1 schematically illustrates the configuration of a hybrid vehicle 20 in one embodiment of the invention, and FIG. 2 schematically illustrates the configuration of an engine 22 mounted on the hybrid vehicle 20. As shown in FIG. 1, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a reduction gear 35 that is attached to a ring gear shaft 32a or a driveshaft linked with the power distribution integration mechanism 30, a motor MG2 that is connected to the reduction gear 35, and a hybrid electronic control unit 70 that controls the operations of the whole hybrid vehicle 20.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through the converter (three-way catalytic converter) 134 that converts toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 receives, via its input port (not shown), signals from various sensors that measure and detect the conditions of the engine 22. The signals input into the engine ECU 24 include a crank position from a crank position sensor 140 measured as the rotational position of the crankshaft 26, a cooling water temperature from a water temperature sensor 142 measured as the temperature of cooling water for the engine 22, a cam position from a cam position sensor 144 measured as the rotational position of a camshaft driven to open and close the intake valve 128 and an exhaust valve 129 for gas intake and exhaust into and from the combustion chamber, a throttle valve position from a throttle valve position sensor 146 detected as the opening of the throttle valve 124, and an intake air flow into the engine 22 from a vacuum sensor 148. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution integration mechanism 30 has a sun gear or external gear 31, a ring gear or internal gear 32 that is arranged concentrically with the sun gear 31, multiple pinion gears 33 that engage with both the sun gear 31 and the ring gear 32, and a carrier 34 that holds the multiple pinion gears 33 to allow their revolutions and rotations on their axes. The power distribution integration mechanism 30 is constructed as a planetary gear mechanism that has differential motions with the sun gear 31, the ring gear 32, and the carrier 34 as rotating elements. When the motor MG1 functions as an electric generator, the power output from the engine 22 and transmitted through the carrier 34 is distributed to the sun gear 31 and the ring gear 32 at their gear ratio. When the motor MG1 functions as an electric motor, on the other hand, the power output from the engine 22 and transmitted through the carrier 34 is integrated with the power output from the motor MG1 and transmitted through the sun gear 31 and is output to the ring gear 32. The power output to the ring gear 32 is accordingly transmitted to drive wheels 63a and 63b via a ring gear shaft 32a, the gear mechanism 60, and the differential gear 62.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The motor MG1 also functions as a starter to rotate the crank shaft 26 of the engine 22 at the time of starting the engine. Operations of both the motors MG1 and MG2 are controlled by a motor electronic control unit (hereinafter, referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by non-illustrated current sensors. The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is a secondary battery having charge-discharge capability, and is under control of a battery electronic control unit (hereinafter, referred to as a battery ECU) 52. The battery ECU 52 receives diverse signals required for control of the battery 50, for example, an inter-terminal voltage Vb measured by a non-illustrated voltage sensor disposed between terminals of the battery 50, a charge-discharge current Ib measured by a non-illustrated current sensor attached to the power line 54 connected with the output terminal of the battery 50, and a battery temperature Tb measured by a temperature sensor 57 attached to the battery 50. The battery ECU 52 outputs data relating to the state of the battery 50 to the hybrid electronic control unit 70 according to the requirements. The battery ECU 52 calculates a state of charge (SOC) of the battery 50, based on the accumulated charge-discharge current measured by the current sensor, for control of the battery 50. An electric double-layer capacitor may be used instead of a secondary battery which is used in this embodiment.

The hybrid electronic control unit 70 is constructed as a microprocessor including a CPU 72, a ROM 74 that stores processing programs, a RAM 76 that temporarily stores data, a non-illustrated input-output port, and a non-illustrated communication port. The hybrid ECU 70 receives various signals via the input port: an ignition signal IG from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 is connected with the engine ECU 24, the motor ECU 40, and the battery ECU 52 via the communication port and transmits diverse control signals and data to and from the engine ECU 24, the motor ECU 40, and the battery ECU 52, as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 55 or supplied by discharging the battery 55, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 55. The motor drive mode stops the operations of the engine 22 and drives and controls the motor MG2 to output a quantity of power equivalent to the required level of power to the ring gear shaft 32a.

Figure 3:
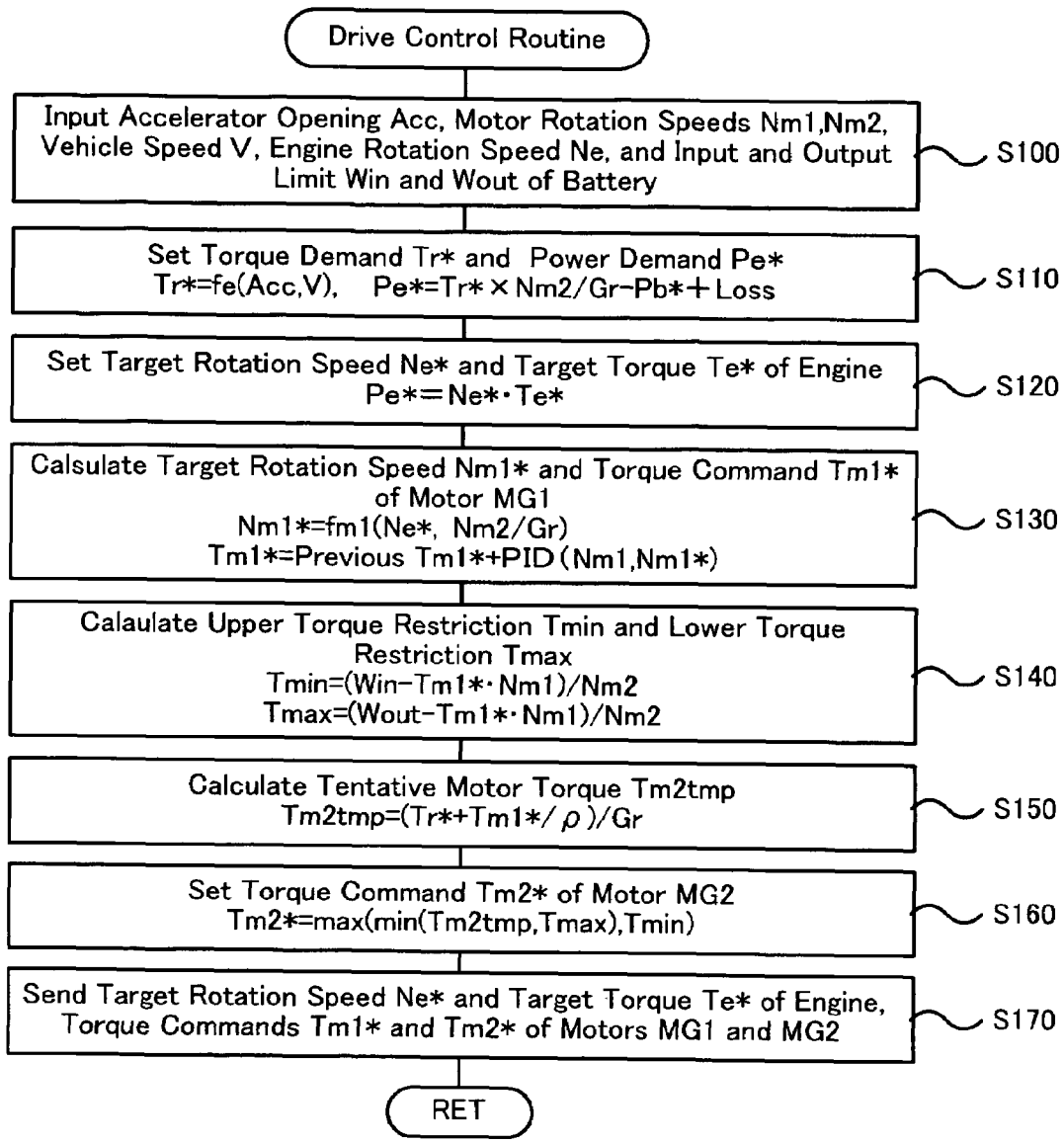
FIG. 3 is a flowchart showing a drive control routine executed by a hybrid electronic control unit 70.

The description regards the operations of the hybrid vehicle 20 of the embodiment having the configuration discussed above. FIG. 3 is a flowchart showing a drive control routine executed by the hybrid electronic control unit 70. This routine is executed repeatedly at preset time intervals (for example, at every 8 msec) after completion of system start control described later.

Figure 4:
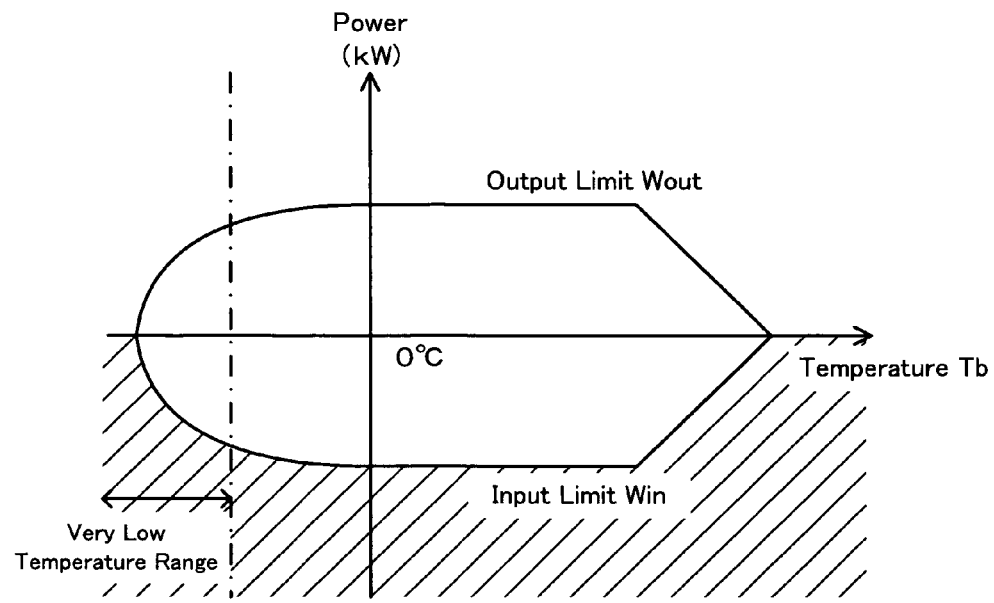
FIG. 4 shows variations of input limit Win and output limit Wout of a battery 50 against a battery temperature Tb.
Figure 5:
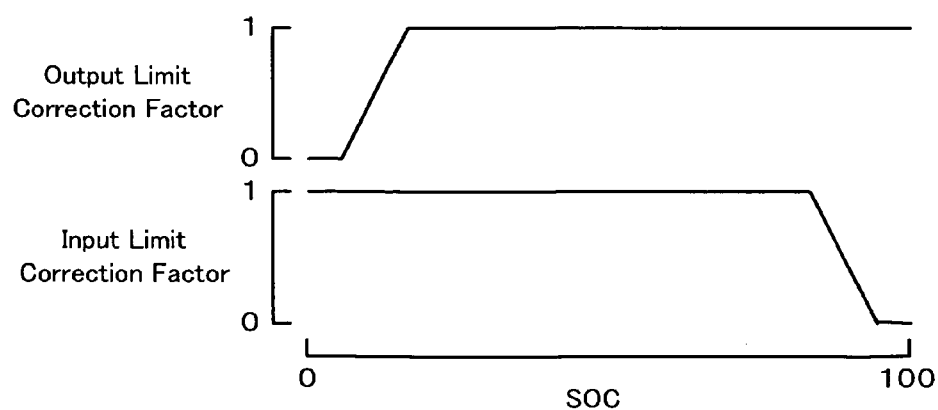
FIG. 5 shows variations of correction factors for the input limit Win and the output limit Wout against state of charge SOC of the battery 50.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, a remaining charge level or state of charge SOC of the battery 50, the battery temperature Tb from the temperature sensor 51 attached to the battery 50, the inter-terminal voltage Vb and the charge-discharge electric current Ib of the battery 50, and an input limit Win and an output limit Wout of the battery 50 (step S100). The rotation speed Ne of the engine 22 is computed from a signal representing the crank position detected by the crank position sensor 140 attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The state of charge SOC, the battery temperature Tb, the inter-terminal voltage Vb, the charge-discharge electric current Ib, the input limit Win, and the output limit Wout of the battery 50 are received from the battery ECU 52 by communication. A concrete procedure of setting the input limit Win and the output limit Wout of the battery 50 sets base values of the input limit Win and the output limit Wout corresponding to the measured battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 4 shows variations of the input limit Win and the output limit Wout of the battery 50 against the battery temperature Tb. FIG. 5 shows variations of the input limit correction factor for the input limit Win and the output limit correction factor for the output limit Wout against the state of charge SOC of the battery 50.

Figure 6:
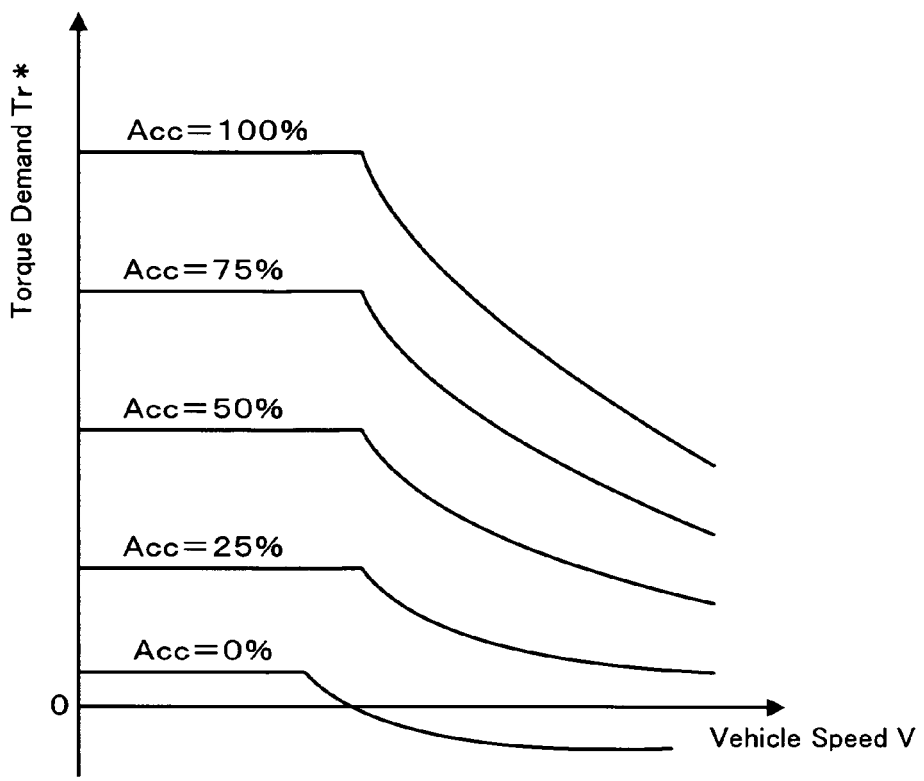
FIG. 6 is an example of a torque demand setting map.

After the data input, the CPU 72 sets a torque demand Tr* to be output to the ring gear shaft 32a or the driveshaft linked to the drive wheels 63a and 63b as the torque required for the vehicle and an engine power demand Pe* required for the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 6. The engine power demand Pe* is calculated as the sum of the product of the torque demand Tr* and a rotation speed Nr of the ring gear shaft 32a, a charge-discharge power demand Pb* to be charged into or discharged from the battery 50, and a potential loss. The charge-discharge power demand Pb* takes a positive value as a power demand to be discharged from the battery 50 and a negative value as a power demand to be charged into the battery 50. The rotation speed Nr of the ring gear shaft 32a is obtained by multiplying the vehicle speed V by a conversion factor k or by dividing the rotation speed Nm2 of the motor MG2 by a gear ratio Gr of the reduction gear 35.

Figure 7:
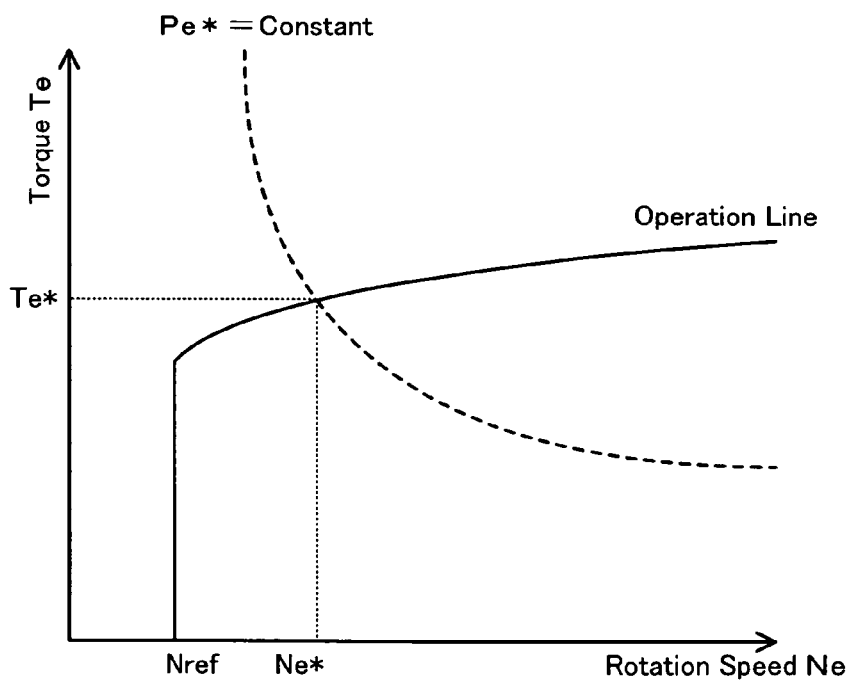
FIG. 7 shows an example of an efficient operation curve of the engine 22 to set target rotation speed Ne* and target torque Te*.

The CPU 72 subsequently sets a target rotation speed Ne* and a target torque Te* of the engine 22, based on the engine power demand Pe* (step S120). The target rotation speed Ne* and the target torque Te* of the engine 22 are determined according to an efficient operation curve of ensuring efficient operation of the engine 22 and a curve of the engine power demand Pe*. FIG. 7 shows an efficient operation curve of the engine 22 to set the target rotation speed Ne* and the target torque Te*. As clearly shown in FIG. 7 the target rotation speed Ne* and the target torque Te* are given as an intersection of the efficient operation curve and a curve of constant engine power demand Pe* (=Ne*×Te*).

The CPU 72 then calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2 \int (Nm1^* - Nm1)dt \quad (2)$$

Figure 8:
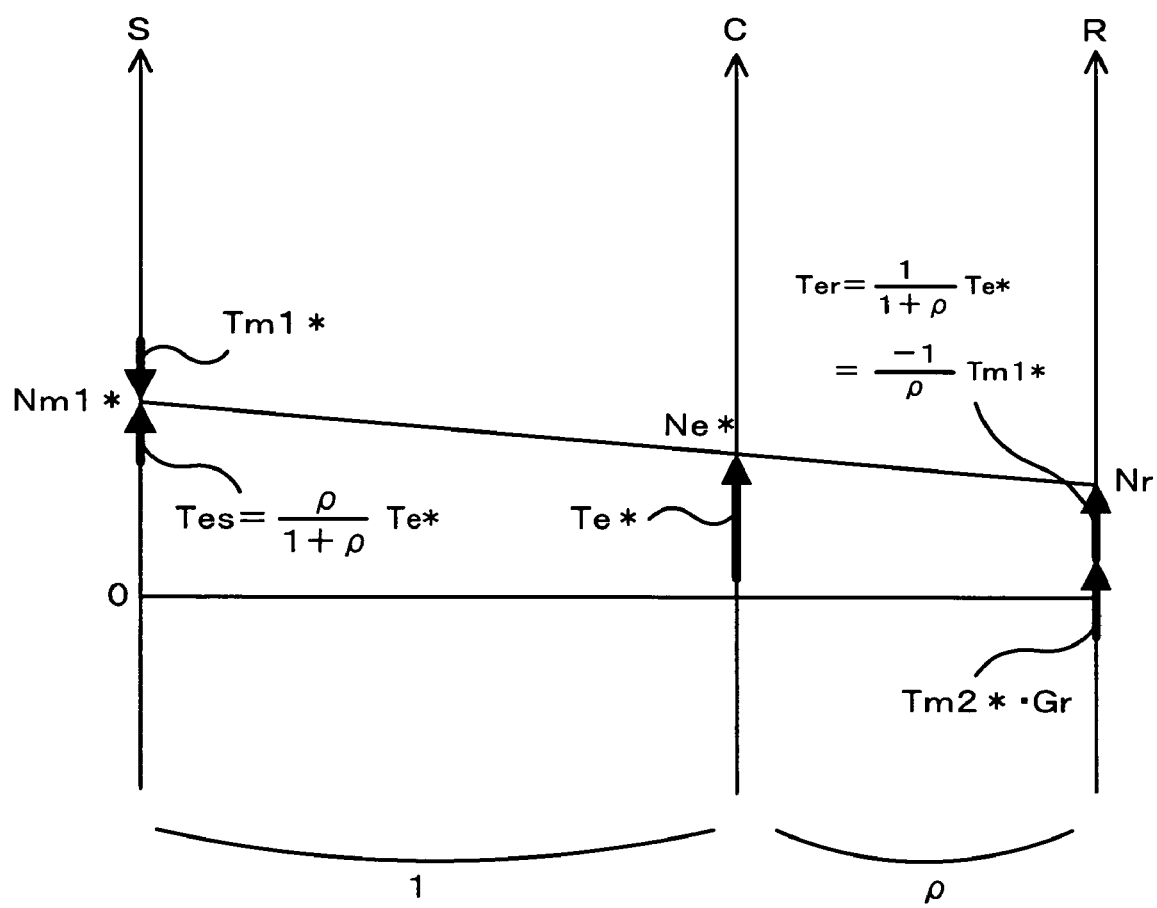
FIG. 8 is an alignment chart showing torque-rotation speed dynamics of the respective rotational elements included in the power distribution integration mechanism 30.

Equation (1) is a dynamic relational expression of the rotational elements included in the power distribution integration mechanism 30. FIG. 8 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 that is equivalent to division of the rotation speed Nm2 of the motor MG2 by the gear ratio Gr of the reduction gear 35. Equation (1) is readily introduced from this alignment chart of FIG. 8. Two upward thick arrows on the axis 'R' respectively show a torque that is transmitted to the ring gear shaft 32a when the torque Te* is output from the engine 22 that is in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S140):

$$Tmin = (Win - Tm1^* \cdot Nm1)/Nm2 \quad (3)$$

$$Tmax = (Wout - Tm1^* \cdot Nm1)/Nm2 \quad (4)$$

The lower torque restriction Tmin and the upper torque restriction Tmax are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S150):

$$Tm2tmp = (Tr^* + Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S160). Setting the torque command Tm2* of the motor MG2 in this manner restricts the torque demand Tr* to be output to the ring gear shaft 32a or the driveshaft within the range between the input limit Win and the output limit Wout of the battery 50. Equation (5) is readily introduced from the alignment chart of FIG. 8.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S170) and exits from this drive control routine. The engine ECU 24 receives the target rotation speed Ne* and the target torque Te* and performs fuel injection control and ignition control of the engine 22 to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

Figure 9:
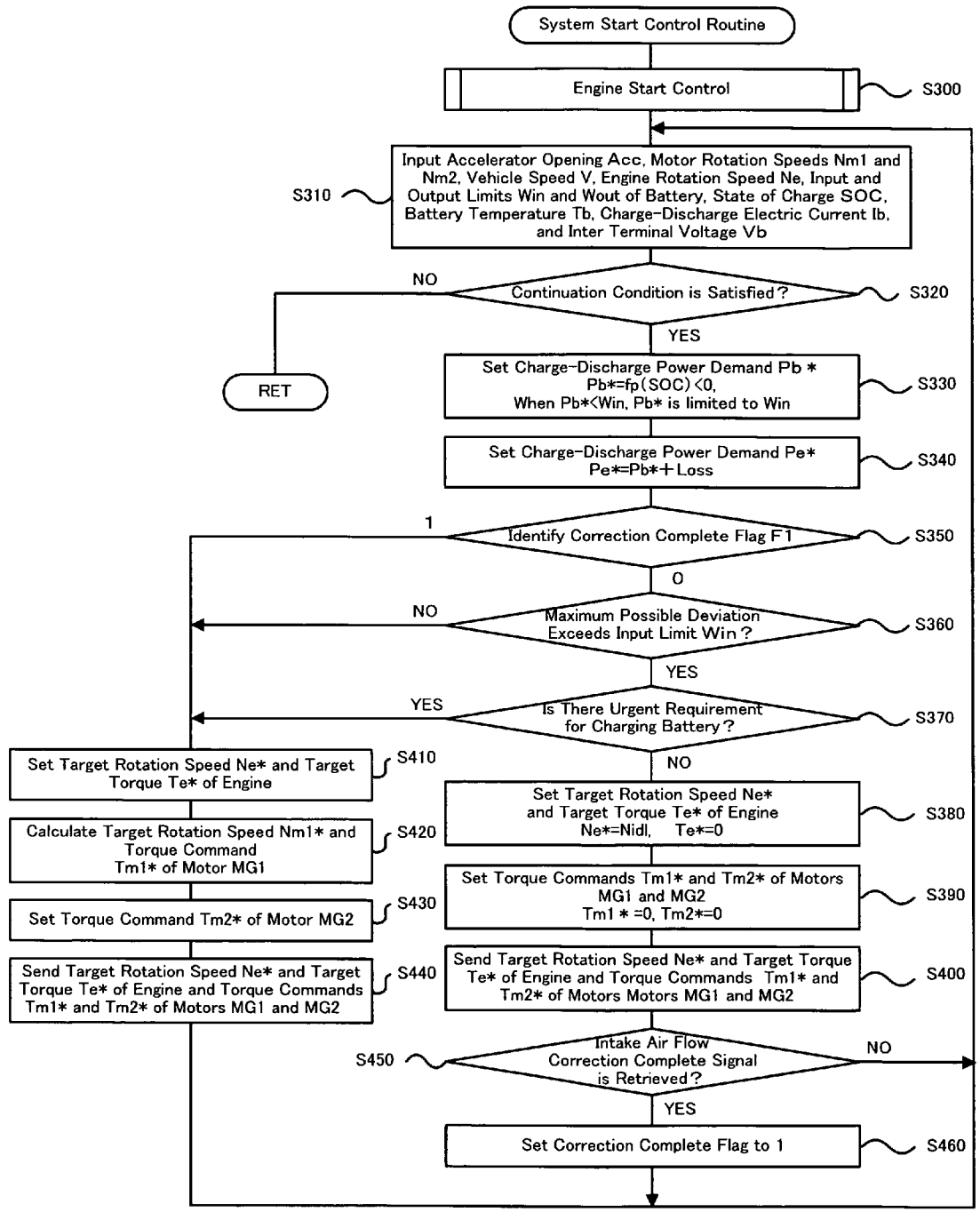
FIG. 9 is a flowchart showing a system start control routine executed by the hybrid electronic control unit 70.

The description regards a series of control operations immediately after a system start in the hybrid vehicle 20 of the embodiment. FIG. 9 is a flowchart showing a system start control routine executed by the hybrid electronic control unit 70. This system start control is triggered by a change of an ignition signal IG output from an ignition switch 80 (see FIG. 1) from OFF to ON during parking of the hybrid vehicle 20 with the setting of the gearshift position SP in a parking (P) position.

In the system start control routine, the CPU 72 of the hybrid electronic control unit 70 first executes engine start control to restart the engine 22 from a stop state (step S300). The engine start control outputs a motoring command to the motor ECU 40 and simultaneously outputs an engine-start combustion control command to the engine ECU 24. The motor ECU 40 receives the motoring command and controls the motor MG1 receiving a supply of electric power from the battery 50 to motor the engine 22. The engine ECU 24 receives the engine-start combustion control command and controls the engine 22 to initiate combustion for a start of the engine 22. According to a concrete procedure, the engine ECU 24 regulates the timing of fuel injection from the fuel injection valve 126 and the ignition timing of igniting the air-fuel mixture with an electric spark of the spark plug 130 to generate a torque, in synchronism with the vertical motions of the piston 132 to open and close the intake valve 128 and the exhaust valve 129 by motoring the engine 22. The engine ECU 24 continues the engine-start combustion control until the engine 22 completely starts to be independently driven. On a complete start of the engine 22, the engine ECU 24 outputs a complete engine start signal representing the complete start of the engine 22 to the hybrid electronic control unit 70. The hybrid electronic control unit 70 receives the complete engine start signal, outputs a motoring end command to the motor ECU 40, and terminates the engine start control. The motor ECU 40 receives the motoring end command and controls the motor MG1 to terminate motoring of the engine 22.

On completion of the engine start control, the CPU 72 of the hybrid electronic control unit 70 inputs various data required for control, that is, the accelerator opening Acc from the accelerator pedal position sensor 84, the vehicle speed V from the vehicle speed sensor 88, the rotation speeds Nm1 and Nm2 of the motors MG1 and MG2, the rotation speed Ne of the engine 22, the state of charge SOC of the battery 50, the battery temperature Tb from the temperature sensor 51 attached to the battery 50, the inter-terminal voltage Vb and the charge-discharge electric current Ib of the battery 50, and the input limit Win and the output limit Wout of the battery 50 (step S310). The data input at step S310 is identical with the data input at step S100 in the drive control routine of FIG. 3 and is not specifically described here. The CPU 72 then specifies satisfaction or unsatisfaction of a continuation condition of this system start control routine (step S320). In this embodiment, the continuation condition is that the vehicle speed V and the accelerator opening Acc are both equal to 0. Upon unsatisfaction of the continuation condition at step S320, the processing flow immediately terminates the system start control routine and goes to the drive control routine of FIG. 3. Upon satisfaction of the continuation condition at step S320, on the other hand, a charge-discharge power demand Pb* is set corresponding to the input state of charge SOC of the battery 50 (step S330). In this state, the charge-discharge power demand Pb* indicates a charge power demand. The charge power demand is required to keep the state of charge SOC at a middle charge level of the battery 50 and is set to a greater value corresponding to the lower state of charge SOC. The charge power demand is not allowed to exceed the input limit Win of the battery 50 (that is, not allowed to enter a hatched area in FIG. 4) and is thus restricted to the input limit Win of the battery 50. The charge power demand is set equal to 0 when the state of charge SOC of the battery 50 reaches or exceeds the medium charge level. The sum of the charge-discharge power demand Pb* and a potential loss is set as the engine power demand Pe* required for the engine 22 (step S340).

The CPU 72 subsequently identifies the value of a correction complete flag F1 as equal to 0 or equal to 1 (step S350). The correction complete flag F1 is reset to 0 in response to a change of the ignition signal IG from OFF to ON and is set to 1 on completion of correction of the intake air flow by the engine ECU 24. Upon identification of the correction complete flag F1 as equal to 0 at step S350, the CPU 72 determines whether a maximum possible deviation between the engine power demand Pe* and an actual output power Pe of the engine 22 exceeds the input limit Win of the battery 50 (step S360). A concrete procedure of determining the maximum possible deviation sets a minimum command value of the engine power demand Pe*, for example, 1 kW, empirically specifies a maximum value of the varying engine output power Pe against the setting of the minimum command value, and calculates a difference between the minimum command value of the engine power demand Pe* and the specified maximum value of the varying engine output power Pe as the maximum possible deviation. The output power Pe of the engine 22 varies with a variation in density of the intake air into the engine 22, which depends upon the temperature, or with a variation in friction of the engine 22, which depends upon the viscosity of lubricating oil in the engine 22. As shown in FIG. 4, in a preset very low temperature range, the absolute value of the input limit Win is set to decrease with a temperature decrease. This is because the flow of electric current to the battery 50 in the very low temperature range significantly increases the inter-terminal voltage Vb to or over voltage resistances of battery constituents, for example, a capacitor. Such setting of the input limit Win increases the possibility that the maximum possible deviation exceeds the input limit Win. When the maximum possible deviation exceeds the input limit Win of the battery 50 at step S360, the CPU 72 subsequently determines whether there is an urgent requirement for charging the battery 50 (step S370). There is an urgent requirement for charging the battery 50 when the battery 50 may cause a failure without immediate charge, for example, when the life of the battery 50 may be shortened without uniform charging of several hundred cells constituting the battery 50.

Under conditions that the correction complete flag F1 is equal to 0 at step S350, the maximum possible deviation exceeds the input limit Win of the battery 50 at step S360, and there is no urgent requirement for charging the battery 50 at step S370, the CPU 72 sets the target rotation speed Ne* of the engine 22 to a preset idling target rotation speed Nidl and the target torque Te* of the engine 22 to 0 (step S380). The CPU 72 then sets the torque commands Tm1* and Tm2* of the motors MG1 and MG2 to 0 (step S390). Such settings cause a torque Tm1 of the motor MG1 on the axis 'S', a torque Te of the engine 22 on the axis 'C', and divisional torques Tes and Ter of the engine torque Te on the axes 'S' and 'R' to be all equal to 0 in the alignment chart of FIG. 8. The rotation speed Ne of the engine 22 is accordingly regulated under no load condition. After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S400). The engine ECU 24 receives the target rotation speed Ne* equal to Nidl and the target torque Te* equal to 0 and performs fuel injection control and ignition control of the engine 22 to idle the engine 22. The motor ECU 40 receives the torque commands Tm1* and Tm2* equal to 0 and performs switching control of the switching elements included in the respective inverters 41 and 42 to drive the motor MG1 with the torque command Tm1* and the motor MG2 with the torque command Tm2*. The CPU 72 then determines whether an intake air flow correction complete signal is received from the engine ECU 24 (step S450). Upon no reception of the intake air flow correction complete signal, the CPU 72 goes back to step S310 and repeats the processing of and after step S310. Upon reception of the intake air flow correction complete signal, on the other and, the CPU 72 sets the correction complete flag F1 equal to 1 (step S460) and then repeats the processing of and after step S310. The engine ECU 24 sends the intake air flow correction complete signal at a specific timing determined by an intake air flow correction process described later.

Identification of the correction complete flag F1 as equal to 1 at step S350, on the other hand, indicates that an idling intake air flow Qidl or an intake air flow in an idling state of the engine 22 has already been corrected. In this state, there is no fear that the output power Pe of the engine 22 exceeds the engine power demand Pe*. The CPU 72 then sets the target rotation speed Ne* and the target torque Te* of the engine 22 to satisfy the engine power demand Pe* set at step S340 (step 410), calculates the target rotation speed Nm1* and the torque command Tm1* of the motor MG1 (step S420), sets the torque command Tm2* of the motor MG2 (step S430), and sends the target rotation speed Ne* and the target torque Te* of the engine 22 to the engine ECU 24 and the torque commands Tm1* and Tm2* of the motors MG1 and MG2 to the motor ECU 40 (step S440). The CPU 72 then goes back to step S310 and repeats the processing of and after step S310. The processing of step S410 is identical with the processing of step S120 in the drive control routine of FIG. 3. The processing of step S420 is identical with the processing of step S130 in the drive control routine of FIG. 3. The processing of step S430 is identical with the processing of steps S140 to S160 in the drive control routine of FIG. 3. These steps S410, S420, and S430 are thus not specifically described here. This series of processing at steps S410 to S430 enables the engine 22 to have the output power Pe substantially equivalent to the engine power demand Pe*. The motor MG1 generates electric power by using the output power Pe of the engine 22 and charges the battery 50 with the generated electric power within the input limit Win of the battery 50. When the maximum possible deviation does not exceed the input limit Win of the battery 50 at step S360, the difference between the engine output power Pe and the engine power demand Pe*, if any, is always within the input limit Win. There is accordingly no fear of overcharging the battery 50 above the input limit Win. In this state, the CPU 72 executes the processing of steps S410 to S440 as described above. When there is an urgent requirement for charging the battery 50 at step S370, the processing of steps S410 to S440 is executed immediately to start charging the battery 50 as soon as possible.

The engine ECU 24 executes the intake air flow correction process, in response to reception of an idling drive command from the hybrid electronic control unit 70 immediately after a start of the engine 22. The idling drive command sets the target rotation speed Ne* and the target torque Te* of the engine 22 respectively equal to the idling target rotation speed Nidl and equal to 0. The intake air flow correction process is described below with reference to the flowchart of FIG. 10.

Figure 10:
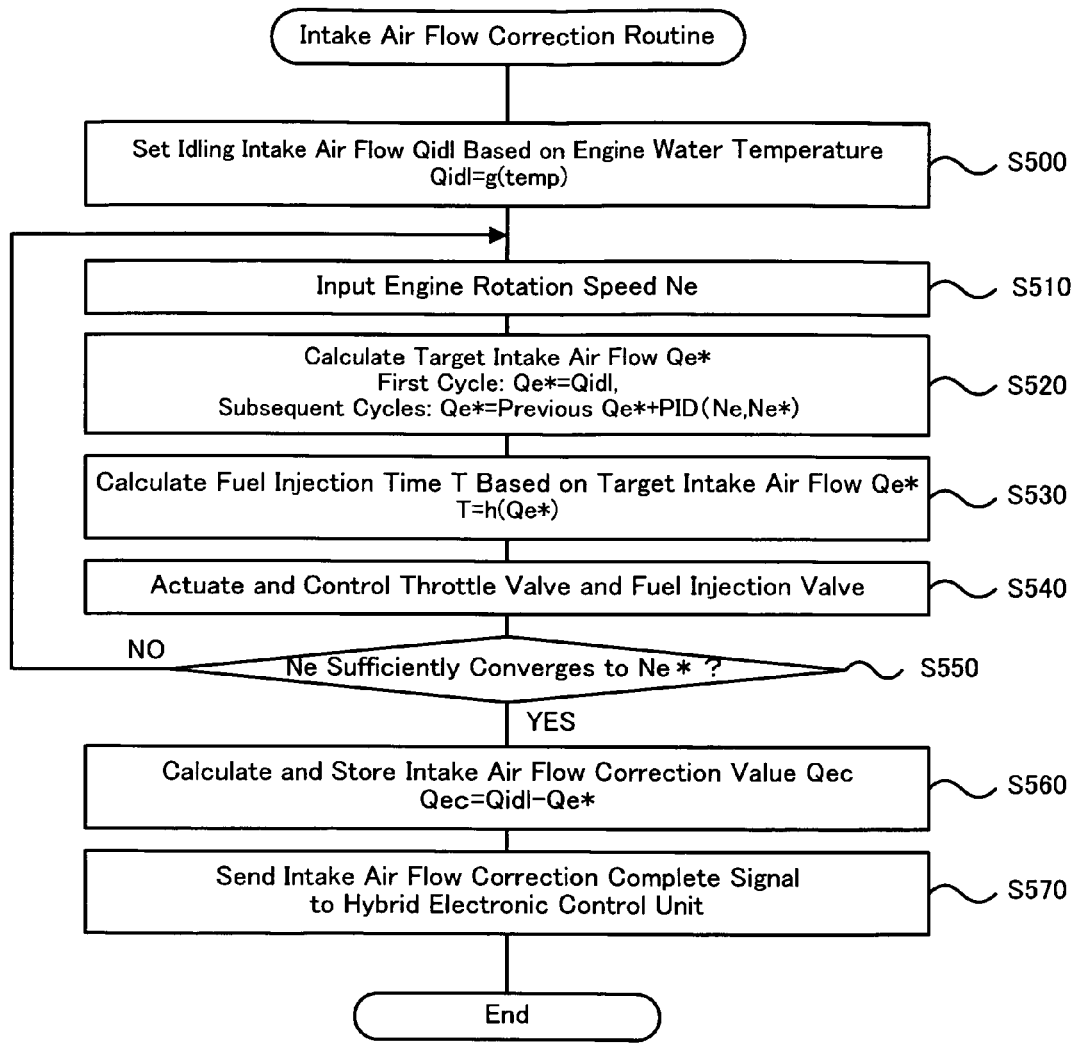
FIG. 10 is a flowchart showing a intake air flow correction routine executed by an engine ECU 24.

In the intake air flow correction routine of FIG. 10, the engine ECU 24 first reads the engine water temperature or the temperature of the cooling water in the engine 22 from the water temperature sensor 142 and sets the idling intake air flow Qidl based on the engine water temperature (step S500). The idling intake air flow Qidle is set corresponding to the idling target rotation speed Nidl. In order to prevent a potential engine stall, the idling intake air flow Qidl is set to be higher than a specific level corresponding to a certain power that balances with the friction of the engine 22. Various lubricating oils have different viscosities and the viscosity of the lubricating oil increases with a temperature decrease. The idling intake air flow Qidl is accordingly set to increase with a decrease in engine water temperature on the assumption that the selected lubricating oil to be used for the engine 22 has an extremely high viscosity. Application of the idling intake air flow Qidl at low temperatures may cause the output power Pe of the engine 22 to exceed the certain power that balances with the friction of the engine 22.

The engine ECU 24 then inputs the current rotation speed Ne of the engine 22 (step S510) and calculates a target intake air flow Qe* (step S520). In a first cycle of this routine, the target intake air flow Qe* is set equal to the idling intake air flow Qidl set at step S500. In subsequent cycles of this routine, the target intake air flow Qe* is calculated from the idling target rotation speed Nidl set to the target rotation speed Ne* of the engine 22 and the input current rotation speed Ne of the engine 22 according to Equation (6) given below:

$$Qe^* = \text{Previous } Qe^* + k3(Nidl-Ne) + k4 \int (Nidl-Ne)dt \quad (6)$$

Equation (6) is a relational expression of feedback control to drive and rotate the engine 22 at the idling target rotation speed Nidl. In Equation (6) given above, 'k3' in the second term and 'k4' in the third term on the right side respectively denote a gain of the proportional and a gain of the integral term.

The engine ECU 24 subsequently calculates a fuel injection time T of the fuel injection valve 126 based on the target intake air flow Qe* (step S530). The fuel injection time T represents a time period required for injection of a certain amount of fuel from the fuel injection valve 126 against the target intake air flow Qe* to attain a preset air-fuel ratio. Since this routine is executed immediately after a start of the engine 22, the preset air-fuel ratio is richer than the stoichiometric air-fuel ratio. The fuel injection time T may be varied according to the engine water temperature. The fuel injection valve 126 has a relatively poor response at low temperatures, so that the fuel injection time T may be set to increase with a decrease in engine water temperature.

The engine ECU 24 actuates the throttle valve motor 136 to regulate the position of the throttle valve 124 corresponding to the target intake air flow Qe* and activates the fuel injection valve 126 open at an adequate timing in each cylinder for the fuel injection time T (step S540). The engine ECU 24 then compares a difference between the actual rotation speed Ne and the target rotation speed Ne* of the engine 22 with a predetermined small reference value (step S550). This comparison determines whether the rotation speed Ne of the engine 22 sufficiently converges to the target rotation speed Ne*. When the difference is still greater than the predetermined small reference value, that is, when the rotation speed Ne of the engine 22 does not sufficiently converge to the target rotation speed Ne* at step S550, the engine ECU 24 goes back to step S510 and repeats the processing of and after step S510. When the difference becomes not greater than the predetermined small reference value, that is, when the rotation speed Ne of the engine 22 sufficiently converges to the target rotation speed Ne* at step S550, on the other hand, the engine ECU 24 subtracts the target intake air flow Qe* from the idling intake air flow Qidl, sets the difference to an intake air flow correction value Qec, and stores the intake air flow correction value Qec into a RAM (not shown) of the engine ECU 24 (step S560). The engine ECU 24 then sends the intake air flow correction complete signal to the hybrid electronic control unit 70 (step S570) and exits from the intake air flow correction control routine.

The target intake air flow Qe* calculated in the subsequent load operation of the engine 22 takes into account this intake air flow correction value Qec. The engine ECU 24 receives the target rotation speed Ne* and the target torque Te* from the hybrid electronic control unit 70 at step S440 in the system start control routine of FIG. 9 and sets the target intake air flow Qe* based on the received target rotation speed Ne*, the received target torque Te*, and the engine water temperature. The engine ECU 24 subtracts the intake air flow correction value Qec from the target intake air flow Qe*, updates the target intake air flow Qe* to the result of the subtraction, and actuates and controls the throttle valve motor 136 with the updated target intake air flow Qe*. When the updated target intake air flow Qe* is lower than a lower threshold value that is set according to the water temperature as an intake air flow to prevent a potential engine stall in the idling operation, the updated target intake air flow Qe* is set equal to the lower threshold value.

Figure 11:
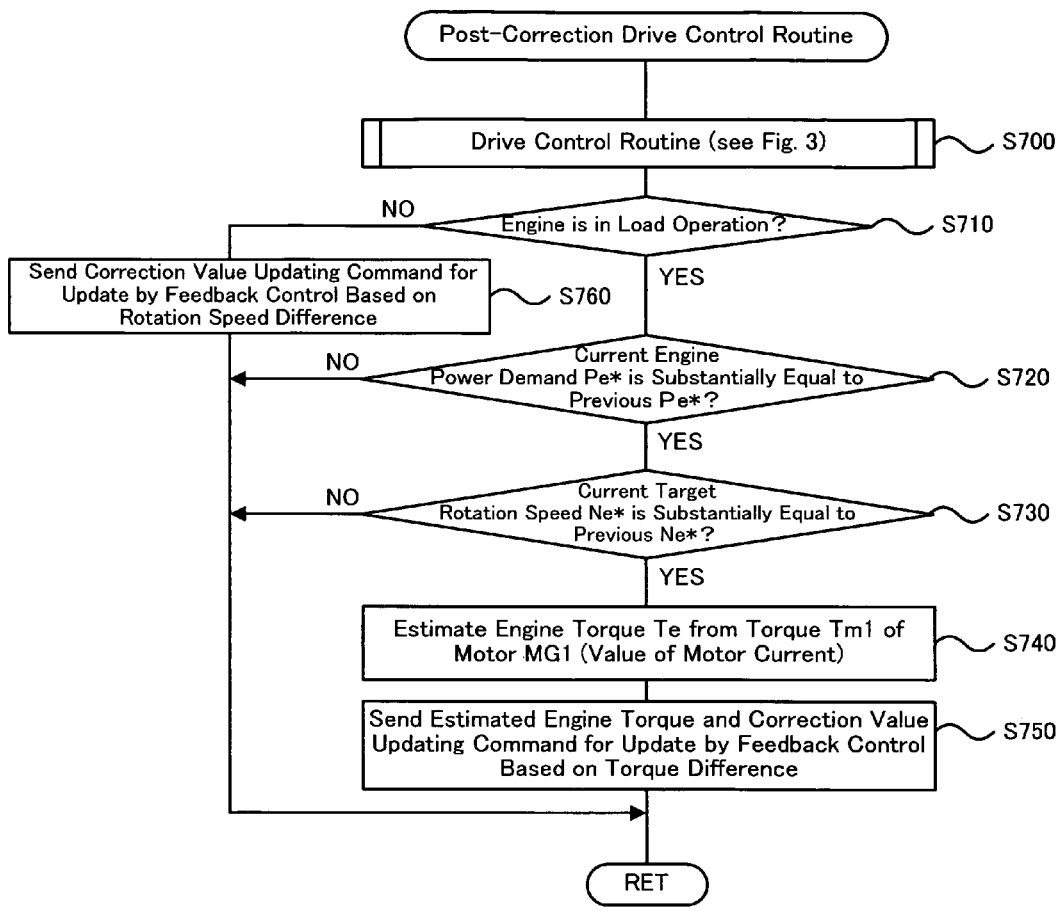
FIG. 11 is a flowchart showing a post-correction drive control routine executed by the hybrid electronic control unit.

The hybrid electronic control unit 70 executes post-correction drive control after reception of the intake air flow correction complete signal from the engine ECU 24. The post-correction drive control is described below with reference to the flowchart of FIG. 11. In the post-correction drive control routine of FIG. 11, the CPU 72 of the hybrid electronic control unit 70 executes the processing of steps S100 to S170 in the drive control routine of FIG. 3 (step S700). The CPU 72 then determines whether the engine 22 is in the load operation, based on the specification of the engine power demand Pe* as equal to 0 or not equal to 0 (step S710). As shown in FIG. 7, when the target rotation speed Ne* of the engine 22 is lower than a preset reference level Nref, the operation efficiency of the engine 22 is significantly worsened. The target torque Te* and accordingly the engine power demand Pe* are set equal to 0 in this state. When the engine 22 is in the load operation at step S710, the CPU 72 successively determines whether the current engine power demand Pe* is substantially equal to a previous engine power demand Pe* (step S720) and whether the current target rotation speed Ne* is substantially equal to a previous target rotation speed Ne* (step S730). In the event of a negative answer at either of steps S720 and S730, the CPU 72 exits from the post-correction drive control routine without any further processing. When the current engine power demand Pe* is substantially equal to the previous engine power demand Pe* at step S720 and the current target rotation speed Ne* is substantially equal to the previous target rotation speed Ne* at step S730, on the other hand, the CPU 72 calculates the torque Tm1 of the motor MG1 from the measured value of electric current in the motor MG1 and estimates the torque Te of the engine 22 from the calculated torque Tm1 (step S740). In the steady operation of the engine 22, the torque Tm1 of the motor MG1 is expressible by an equation of the torque Te of the engine 22 and the gear ratio ρ of the power distribution integration mechanism 30. Namely the torque Te of the engine 22 is expressible by an equation of the torque Tm1 of the motor MG1 and the gear ratio ρ as shown in FIG. 8. The torque Te of the engine 22 is thus estimable from the torque Tm1 of the motor MG1. The CPU 72 then sends the estimated torque Te of the engine 22 and a correction value updating command to the engine ECU 24 to update the intake air flow correction value Qec by feedback control based on a torque difference (step S750), and exits from the post-correction drive control routine. When the engine 22 is not in the load operation but in the non-load operation (idling operation) at step S710, on the other hand, the CPU 72 sends a correction value updating command to the engine ECU 24 to update the intake air flow correction value Qec by feedback control based on a rotation speed difference (step S760), and exits from the post-correction drive control routine. The adequacy of the intake air flow correction value Qec may be varied with a temperature variation. The intake air flow correction is thus to be updated at adequate timings in the non-load operation as well as in the load operation of the engine 22.

The engine ECU 24 executes an intake air flow correction updating process in response to reception of the correction value updating command from the hybrid electronic control unit 70. The intake air flow correction updating process is described below with reference to the flowchart of FIG. 12.

Figure 12:
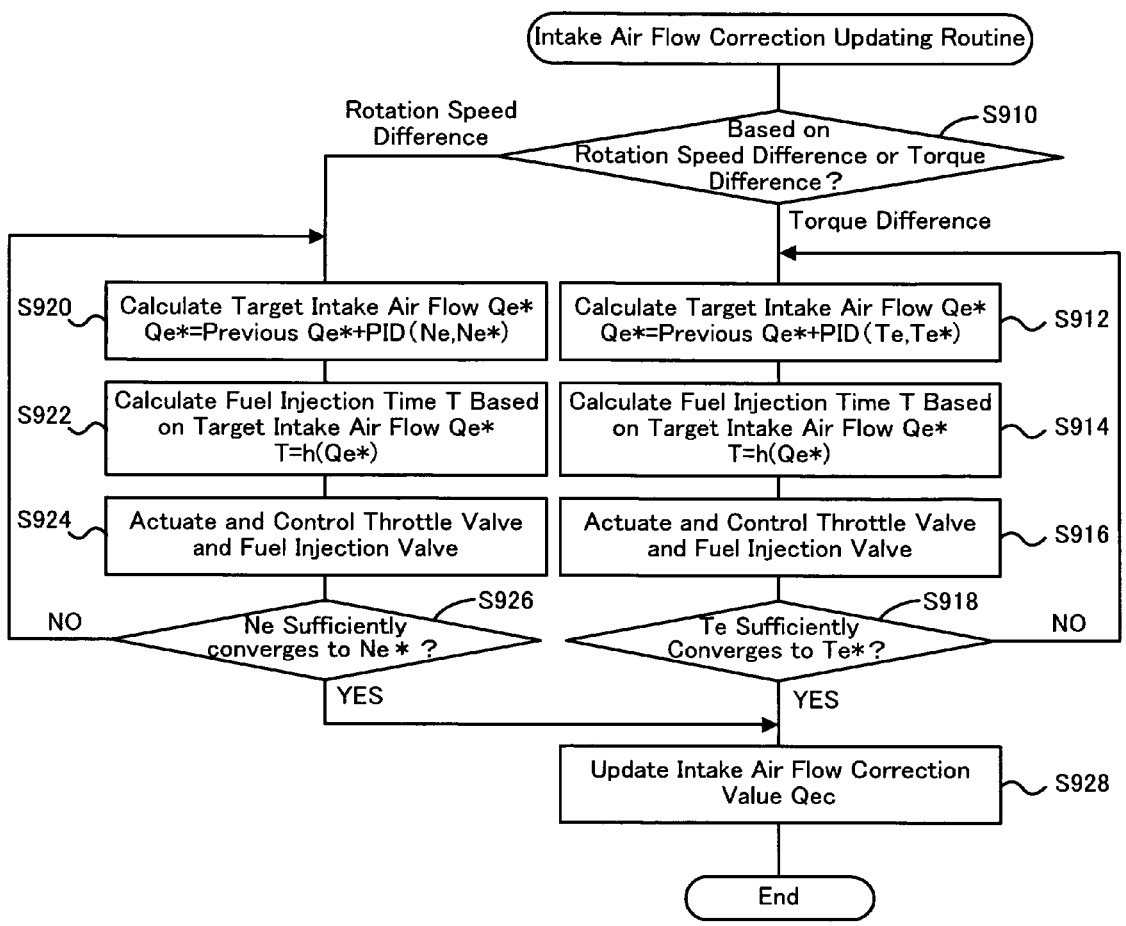
FIG. 12 is a flowchart showing an intake air flow correction updating routine executed by the engine ECU.

In the intake air flow correction updating routine of FIG. 12, the engine ECU 24 first identifies whether the currently received correction value updating command is a command for update by feedback control based on the rotation speed difference or a command for update by feedback control based on the torque difference (step S910). Upon identification of the currently-received correction value updating command as the command for update by feedback control based on the torque difference at step S910, the engine ECU 24 recalculates the target intake air flow Qe* based on the torque difference (step S912). A concrete procedure of step S912 recalculates the target intake air flow Qe* from the current target torque Te* and the estimated torque Te of the engine 22 received from the hybrid electronic control unit 70 according to Equation (7) given below:

$$Qe^* = \text{Previous } Qe^* + k5(Te^* - Te) + k6\int(Te^* - Te)dt \quad (7)$$

Equation (7) is a relational expression of feedback control to cause the engine 22 to generate the target torque Te*. In Equation (7) given above, 'k5' in the second term and 'k6' in the third term on the right side respectively denote a gain of the proportional and a gain of the integral term.

The engine ECU 24 subsequently calculates the fuel injection time T of the fuel injection valve 126 based on the recalculated target intake air flow Qe* (step S914). The engine ECU 24 actuates the throttle valve motor 136 to regulate the position of the throttle valve 124 corresponding to the recalculated target intake air flow Qe* and activates the fuel injection valve 126 open at an adequate timing in each cylinder for the fuel injection time T (step S916). The engine ECU 24 then compares a difference between the actual torque Te and the target torque Te* of the engine 22 with a predetermined small reference value (step S918). This comparison determines whether the torque Te of the engine 22 sufficiently converges to the target torque Te*. When the difference is still greater than the predetermined small reference value, that is, when the torque Te of the engine 22 does not sufficiently converge to the target torque Te* at step S918, the engine ECU 24 goes back to step S912 and repeats the processing of and after step S912.

Upon identification of the currently-received correction value updating command as the command for update by feedback control based on the rotation speed difference at step S910, on the other hand, the engine ECU 24 recalculates the target intake air flow Qe* based on the rotation speed difference (step S920). The engine ECU 24 subsequently calculates the fuel injection time T of the fuel injection valve 126 based on the recalculated target intake air flow Qe* (step S922). The engine ECU 24 actuates the throttle valve motor 136 to regulate the position of the throttle valve 124 corresponding to the recalculated target intake air flow Qe* and activates the fuel injection valve 126 open at an adequate timing in each cylinder for the fuel injection time T (step S924). The engine ECU 24 then compares a difference between the actual rotation speed Ne and the target rotation speed Ne* of the engine 22 with a predetermined small reference value (step S926). This comparison determines whether the rotation speed Ne of the engine 22 sufficiently converges to the target rotation speed Ne*. When the difference is still greater than the predetermined small reference value, that is, when the rotation speed Ne of the engine 22 does not sufficiently converge to the target rotation speed Ne* at step S926, the engine ECU 24 goes back to step S920 and repeats the processing of and after step S920.

When the torque Te of the engine 22 sufficiently converges to the target torque Te* at step S918 or when the rotation speed Ne of the engine 22 sufficiently converges to the target rotation speed Ne* at step S926, the engine ECU 24 updates the intake air flow correction value Qec based on the target intake air flow Qe* in the converging state (step S928) and exits from the intake air flow correction updating routine. The intake air flow correction value Qec may be updated as:

Updated Qec=Previous Qec−(Qe* After Convergence−Qe* Before Convergence)

Figure 13:
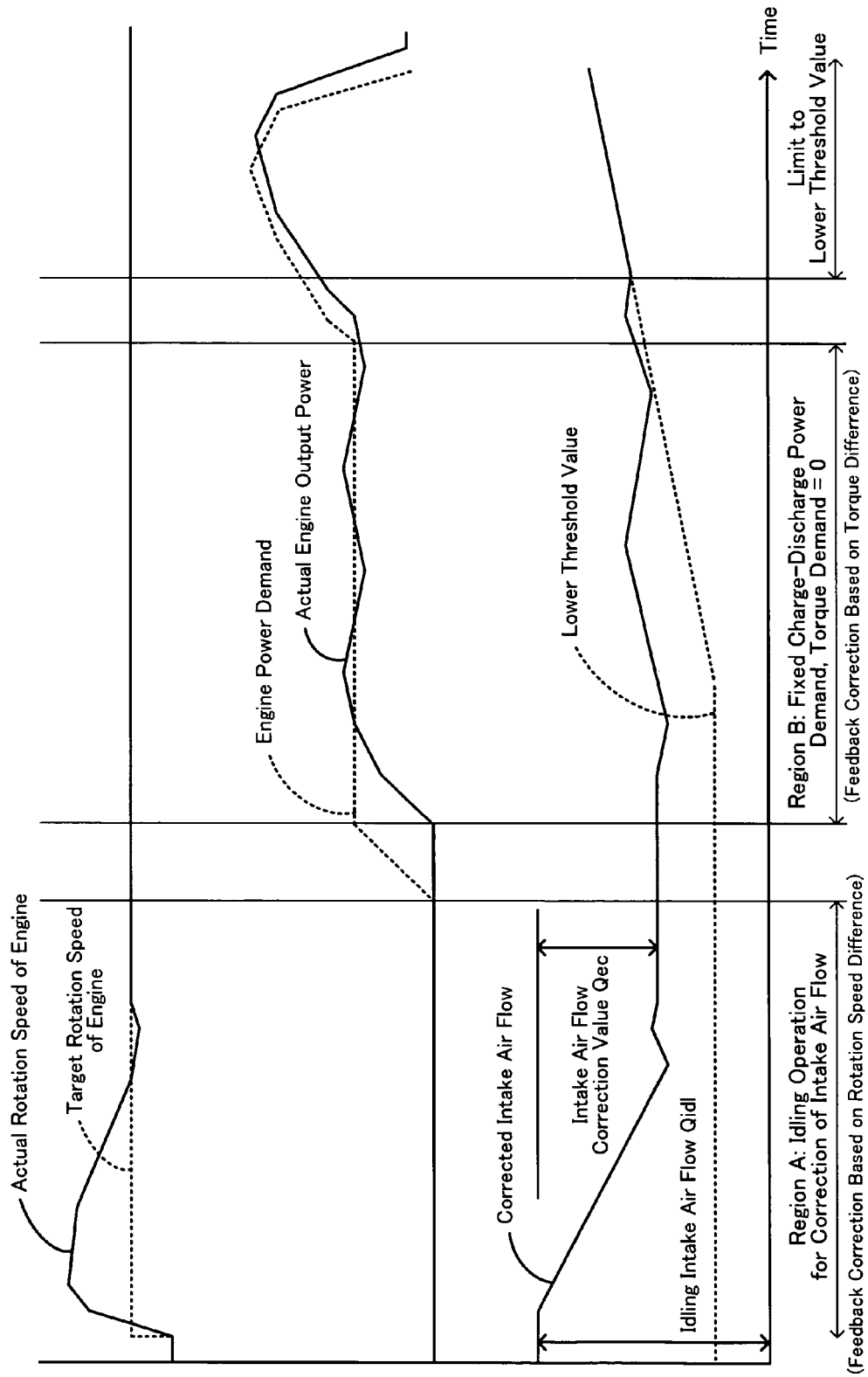
FIG. 13 is a time chart showing a concrete example of the correction control attained by the routines.

A concrete example of the correction control is described below with reference to the time chart of FIG. 13. When the hybrid vehicle 20 is in the very low temperature range shown in FIG. 4, the engine 22 is set in the idling operation immediately after its start triggered by a change of the ignition signal IG from OFF to ON. In this state, the engine ECU 24 calculates the intake air flow correction value Qec according to the flowchart of FIG. 10 (see Region A in FIG. 13). In an early stage of the region A, the actual rotation speed Ne of the engine 22 is higher than the target rotation speed Ne*. As mentioned previously, the idling intake air flow Qidl in the very low temperature range is set to a level corresponding to a power that exceeds the friction of the engine 22 and prevents a potential engine stall on the assumption that the selected lubricating oil to be used for the engine 22 has an extremely high viscosity. In the actual state, however, the selected lubricating oil has a relatively low viscosity. This leads to a greater output power than an expected level and makes the actual engine rotation speed Ne higher than the target rotation speed Ne*. In a last stage of the region A, on the other hand, the feedback control based on the rotation speed difference is performed to converge the rotation speed Ne of the engine 22 to the target rotation speed Ne*. Namely the actual rotation speed Ne of the engine 22 is substantially equal to the target rotation speed Ne* in this last stage of the region A. The result of subtraction of an intake air flow Qe in this converging state from the idling intake air flow Qidl is set and stored as the intake air flow correction value Qec.

In the load operation of the engine 22 with a substantially constant engine power demand Pe* (see Region B in FIG. 13), for example, in the load operation of the engine 22 with a substantially fixed charge-discharge power demand Pb* and the torque demand Tr* practically equal to 0, the feedback control based on the torque difference is performed to update the intake air flow correction value Qec. The intake air flow correction value Qec tends to increase with a temperature decrease. Under the condition of a temperature increase from the very low temperature range after a start of the engine 22, subtraction of the non-updated intake air flow correction value Qec from the intake air flow Qe may cause the corrected intake air flow Qe to have an excessively small value and may thus trigger an engine stall in the idling operation of the engine 22. A lower limit of the intake air flow Qe that is free from a potential engine stall even in the idling operation of the engine 22 is empirically determined according to the engine water temperature and is set as the lower threshold value. When the corrected intake air flow Qe is lower than this lower threshold value, the corrected intake air flow Qe is set equal to the lower threshold value. This effectively prevents a potential engine stall.

The power distribution integration mechanism 30 and the motor MG1 of this embodiment are equivalent to the electric power-mechanical power input output mechanism of the invention. More specifically the power distribution integration mechanism 30 and the motor MG1 of the embodiment respectively correspond to the three shaft-type power input output module and the generator of the invention. The battery 50 of the embodiment corresponds to the accumulator unit of the invention. The hybrid electronic control unit 70 and the engine ECU 24 of the embodiment are equivalent to the control module of the invention. The throttle valve motor 136 of the embodiment corresponds to the intake air flow regulation unit of the invention. The above description of the embodiment clarifies the operations of the hybrid vehicle 20, as well as the control method of the power output apparatus mounted on the hybrid vehicle 20.

As described above, the hybrid vehicle 20 of the embodiment corrects the idling intake air flow Qidl to enable the engine 22 immediately after its start to generate the output power Pe practically equivalent to the engine power demand Pe*. After the correction of the idling intake air flow Qidl, the hybrid vehicle 20 corrects the intake air flow Qe of the engine 22 with reflection of the intake air flow correction value Qec and controls the motor MG1 to generate electric power by using the output power Pe of the engine 22 and charge the battery 50 with the generated electric power within the input limit Win. Such control enables the engine 22 to generate the output power Pe that is substantially equal to the engine power demand Pe*, prior to charge of the battery 50. Namely there is no fear that the output power Pe of the engine 22 exceeds the engine power demand Pe* in restriction of the charge level of the battery 50. This arrangement effectively prevents the state of charge SOC of the battery 50, which is charged with the electric power generated by the motor MG1, from exceeding the input limit Win.

When the temperature of the battery 50 is in the preset very low temperature range (see FIG. 4), the idling intake air flow Qidl is set to a large value to prevent a potential engine stall on the assumption that the selected lubricating oil to be used for the engine 22 has an extremely high viscosity. Under such conditions, there is a high possibility that the output power Pe of the engine 22 exceeds the engine power demand Pe* without the control of the embodiment. Application of the technique of the invention is thus especially effective in this very low temperature range.

When the maximum possible deviation between the actual engine output power Pe and the engine power demand Pe* under control of the engine 22 without correction of the intake air flow does not exceed the input limit Win of the battery 50, there is no fear of overcharging the battery 50 above the input limit Win. This state does not require the correction of the intake air flow but enables an early start of charging the battery 50.

When there is an urgent requirement for charging the battery 50 (for example, when the battery 50 has a significantly low state of charge and may cause a failure without immediate charge), the control skips the correction of the intake air flow. This enables immediate charge of the battery 50.

The intake air flow correction value Qec set immediately after a start of the engine 22 may become inadequate during operation of the engine 22. The control procedure of the embodiment updates the intake air flow correction value Qec in the load operation as well as in the non-load operation of the engine 22. Such update keeps the intake air flow correction value Qec continuously adequate. The update of the intake air flow correction value Qec is performed to a certain extent that the corrected intake air flow Qe does not decrease below the lower threshold value. This effectively prevents a potential stall of the engine 22.

The embodiment discussed above is to be considered in all aspects as illustrative and not restrictive. There may be many modifications, changes, and alterations without departing from the scope or spirit of the main characteristics of the present invention.

The control procedure of the embodiment corrects the idling intake air flow Qidl of the engine 22 as a parameter relating to the power variation of the engine 22. The correction of the idling intake air flow Qidl may be replaced by correcting the amount of fuel injection, the fuel injection timing, or the ignition timing.

The system start control routine of the embodiment shown in FIG. 9 determines whether the maximum possible deviation exceeds the input limit Win at step S360. This step may be replaced by determination of whether the temperature of the battery 50 enters a preset temperature range, for example, the preset very low temperature range shown in FIG. 4. The input limit Win of the battery 50 is set as the function of the temperature as shown in FIG. 4. One possible modification may set a specific temperature range where the maximum possible deviation exceeds the input limit Win and determine whether the temperature of the battery 50 enters the specific temperature range. This temperature-based determination is equivalent to the determination of whether the maximum possible deviation exceeds the input limit Win.

The intake air flow correction routine of the embodiment shown in FIG. 10 computes the intake air flow correction value Qec by subtracting the recalculated target intake air flow Qe* from the idling intake air flow Qidl at step S560. One possible modification may compute the intake air flow correction value Qec by dividing the recalculated target intake air flow Qe* by the idling intake air flow Qidl. In this modification, the target intake air flow Qe* is corrected by multiplying the previous target intake air flow Qe* by a preset correction factor.

Figure 14:
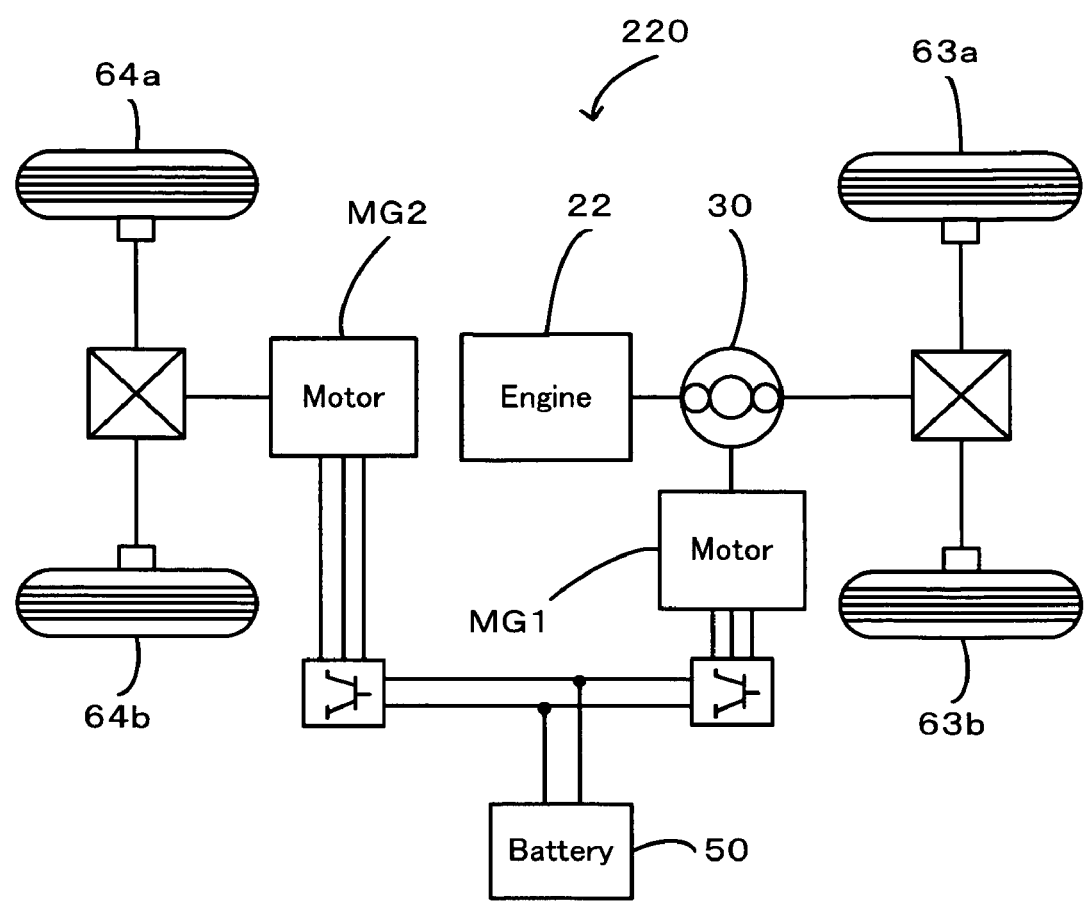
FIG. 14 schematically illustrates the configuration of a hybrid vehicle 220 in one modified structure.

In the hybrid vehicle 20 of the embodiment, the power of the motor MG2 is subjected to gear change by the reduction gear 35 and is output to the ring gear shaft 32a. In one possible modification shown as a hybrid vehicle 220 of FIG. 14, the power of the motor MG2 may be output to another axle (that is, an axle linked with wheels 64a and 64b), which is different from an axle connected with the ring gear shaft 32a (that is, an axle linked with the wheels 63a and 63b).

Figure 15:
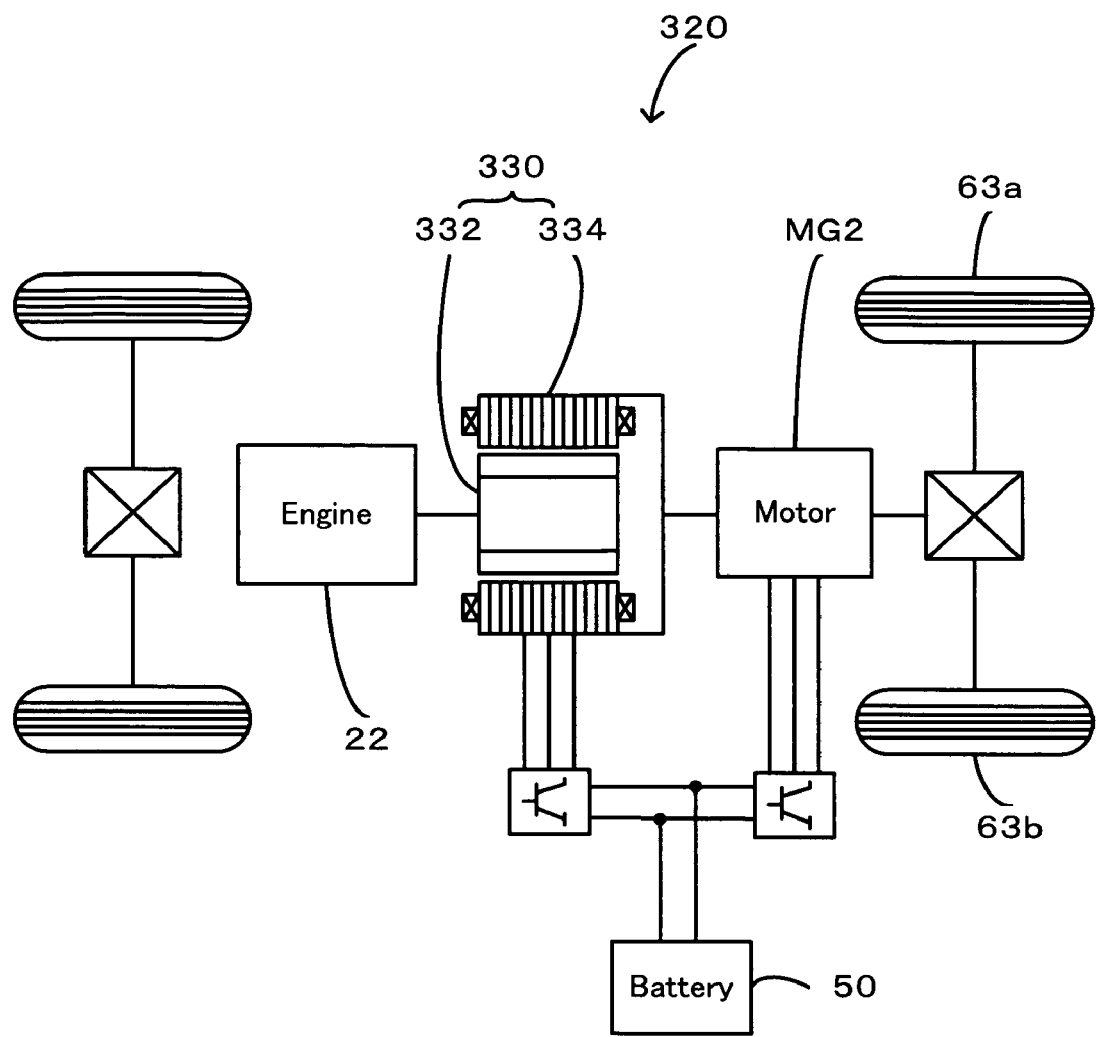
FIG. 15 schematically illustrates the configuration of a hybrid vehicle 220 in another modified structure.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 15, a hybrid vehicle 320 may have a pair-rotor motor 330, which has an inner rotor 332 connected with the crankshaft 26 of the engine 22 and an outer rotor 334 connected with the drive shaft for outputting the power to the drive wheels 63a, 63b and transmits part of the power output from the engine 22 to the drive shaft while converting the residual part of the power into electric power.

The present application claims the benefit of priority from Japanese Patent Application No. 2005-150177 filed on May 23, 2005, the entire contents of which is incorporated by reference herein.

What is claimed is:

1. A power output apparatus that outputs power to a driveshaft, said power output apparatus comprising:

an internal combustion engine that is driven to output power;

an electric power-mechanical power input output mechanism that is connected with an output shaft of the internal combustion engine and with the driveshaft and outputs at least part of the power of the internal combustion engine to the driveshaft through input and output of electric power and mechanical power;

an accumulator unit that transmits electric power to and from the electric power-mechanical power input output mechanism;

an intake air flow regulation unit that regulates an intake air flow into the internal combustion engine; and a control module that controls the intake air flow regulation unit to supply a preset idling intake air flow in a preset very low temperature range, which is set to a greater value than a value in an ordinary temperature range, to the internal combustion engine immediately after its start and attain an idling operation of the internal combustion engine when a temperature of the accumulator unit is in the preset very low temperature range, and corrects the idling intake air flow to make a rotation speed of the internal combustion engine in the idling operation sufficiently approach to a predetermined idling rotation speed, after the correction of the idling intake air flow, said control module controlling the internal combustion engine with reflection of the correction of the idling intake air flow and controlling the electric power-mechanical power input output mechanism to generate electric power by using the power of the internal combustion engine and to charge the accumulator unit with the generated electric power within an input limit of the accumulator unit.

2. A power output apparatus in accordance with claim 1, wherein said control module performs the correction when a maximum potential deviation between the engine power demand required for the internal combustion engine and an actual output power of the internal combustion engine under control of the operation without the correction exceeds the input limit of the accumulator unit, while not performing the correction when the maximum potential deviation does not exceed the input limit of the accumulator unit.

3. A power output apparatus in accordance with claim 1, wherein when there is an urgent requirement for charging the accumulator unit, said control module does not perform the correction but controls the internal combustion engine and the electric power-mechanical power input output mechanism to generate electric power by using the power of the internal combustion engine and to charge the accumulator unit with the generated electric power within the input limit of the accumulator unit.

4. A power output apparatus in accordance with claim 1, wherein said control module controls the internal combustion engine to generate a substantially fixed output power and have a substantially fixed rotation speed and subsequently updates the correction.

5. A power output apparatus in accordance with claim 1, wherein said control module updates the correction only when the internal combustion engine generates a substantially fixed output power and has a substantially fixed rotation speed.

6. A power output apparatus in accordance with claim 4, wherein said control module updates the correction with restriction of a threshold value set to prevent a potential stall of the internal combustion engine.

7. A power output apparatus in accordance with claim 5, wherein said control module updates the correction with restriction of a threshold value set to prevent a potential stall of the internal combustion engine.

8. A power output apparatus in accordance with claim 1, wherein said electric power-mechanical power input output mechanism includes:

a generator that outputs power to a rotating shaft; and a three shaft-type power input output module that is linked to three shafts, that is, an output shaft of the internal combustion engine, the rotating shaft of the motor, and the drive shaft, and determines power input from and output to a residual one shaft based on powers input from and output to any two shafts among the three shafts.

9. A power output apparatus in accordance with claim 1, wherein said electric power-mechanical power input output mechanism includes:

a pair-rotor motor that has a first rotor linked to an output shaft of the internal combustion engine and a second rotor linked to the drive shaft and rotates the first rotor and the second rotor relative to each other.

10. A motor vehicle that is equipped with a power output apparatus in accordance with claim 1, wherein an axle is linked to the driveshaft.

11. A control method of a power output apparatus that outputs power to a driveshaft and includes an internal combustion engine, an electric power-mechanical power input output mechanism that is connected with an output shaft of the internal combustion engine and with a driveshaft and outputs at least part of the power of the internal combustion engine to the driveshaft through input and output of electric power and mechanical power, and an accumulator unit that transmits electric power to and from the electric power-mechanical power input output mechanism, and an intake air flow regulation unit that regulates an intake air flow into the internal combustion engine; said control method comprising the steps of:

(a) when a temperature of the accumulator unit is in a preset very low temperature range, controlling the intake air flow regulation unit to supply a preset idling intake air flow in the preset very low temperature range, which is set to a greater value than a value in an ordinary temperature range, to the internal combustion engine immediately after its start and attain an idling operation of the internal combustion engine, and correcting the idling intake air flow to make a rotation speed of the internal combustion engine in the idling operation sufficiently approach to a predetermined idling rotation speed; and (b) after said step (a), controlling the internal combustion engine with reflection of the correction of the idling intake air flow in said step (a) and controlling the electric power-mechanical power input output mechanism to generate electric power by using the power of the internal combustion engine and to charge the accumulator unit with the generated electric power within an input limit of the accumulator unit.

* * * * *